May 13, 1930.   P. LIEBERGELD   1,758,842
MECHANICAL TIME FUSE
Filed Aug. 12, 1929
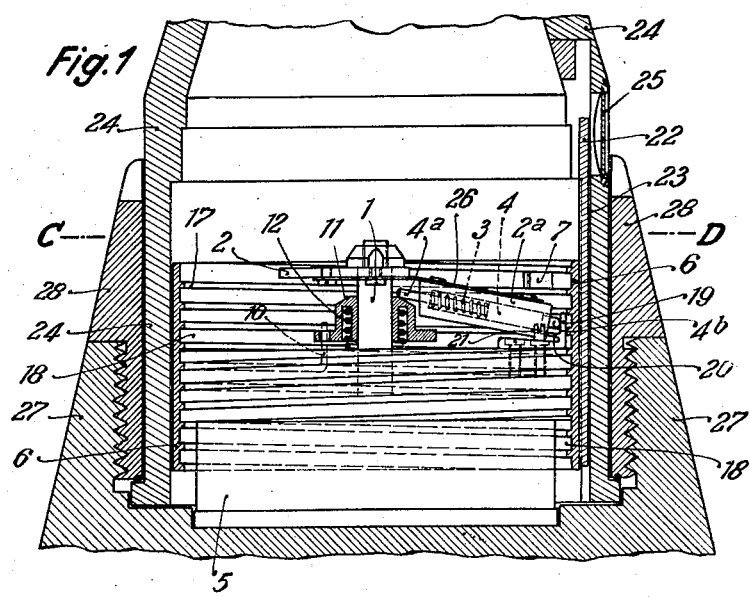
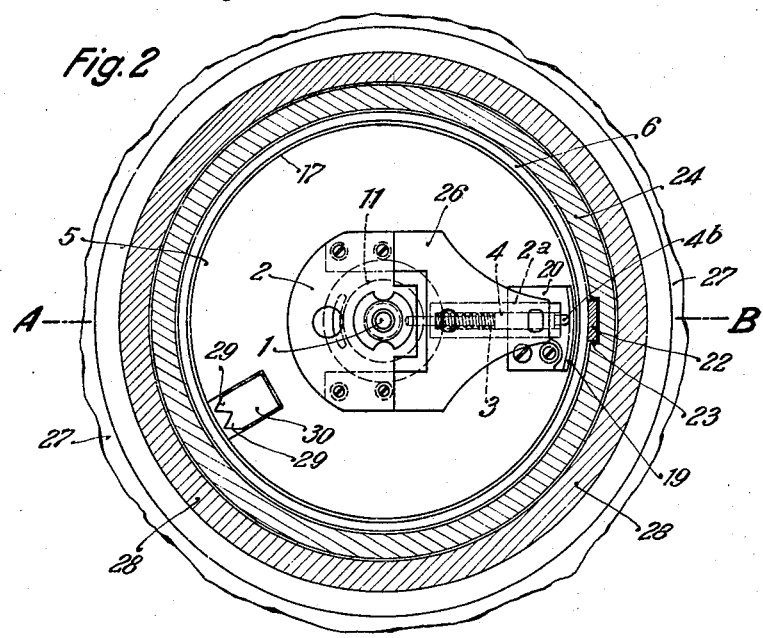
P. Liebergeld
INVENTOR
By: Marks & Clerk
ATTYS.

Patented May 13, 1930

1,758,842

UNITED STATES PATENT OFFICE

PAUL LIEBERGELD, OF BAD THAL, THURINGIA, GERMANY

MECHANICAL TIME FUSE

Application filed August 12, 1929, Serial No. 385,163, and in Germany October 6, 1927.

This invention relates to a mechanical time fuse with clockwork mechanism, in which a pointer or index which normally locks the operating members of the fuse by means of a springloaded slidable pin coacts with an adjustable timing member in such a manner that the pointer must first revolve about its axis once or more than once before being released from the timing member and thereupon itself releases the operating members of the fuse.

It has already been proposed to cause the springloaded pin of the pointer of the clockwork mechanism to act against an intermediate member which normally locks it in the safe position and which engages by means of a pin with the spiral groove in an adjustable disc disposed above the pointer of the clockwork. According to the setting of this disc the pointer and the intermediate member pivoted to it must first perform one or several revolutions until the pin of the intermediate member reaches a gap at the end of the spiral groove, whereupon it is released from the spiral groove and thereby releases a springloaded locking pin of the clockwork pointer. The pointer can consequently occupy its release position and thereby bring about the release of the operating members. The arrangement of a horizontal adjusting disc provided with a spiral groove, has the disadvantage, however, that the spring-loaded pin of the clockwork pointer can coact with it only through an intermediate member, which naturally entails a further possible source of error. Finally, as from constructional reasons the diameter of this adjustable disc must be made relatively small this older form of time fuse is useful only to a limited degree.

The present invention has for its object to provide the possibility of increasing the number of possible revolutions of the clockwork pointer and of thus making it possible to considerably increase the size of the subdivisions of the scale. An adjusting scale however in which the graduations are somewhat spaced apart provides for accurate and correct adjustment.

The invention consists in the first place in this, that the clockwork pointer coacts directly with the timing member which has the shape of a ring. It is provided on its inner surface with a helical guiding groove with which the spring-loaded pin of the pointer engages after the projectile has been fired. The pointer pin then travels in the groove up to the releasing gap provided at the end of the helical groove along a helical path the length of which varies in accordance with the previous adjustment of the annular timing member.

A further feature of the invention is that the clockwork pointer is yieldingly connected by a spring or a link with the shaft of the pointer, in order that the point of the pointer can gradually follow the convolutions in the timing member without the pointer shaft being displaced.

The accompanying drawing shows one constructional example,

Fig. 1 being a section on line A—B of Fig. 2, the clockwork pointer being in elevation and Fig. 2 a section on line C—D of Fig. 1.

In the circumference of the clockwork casing 5 a thread is cut, on which the timing ring 6 provided with a corresponding thread 17 can be screwed and from which it can be unscrewed. The thread may have any suitable contour. On the outside of the time-ring 6 a guiding rod 22 of any suitable cross-section, for instance a rectangular cross-section, is fixed, which rod is guided in a longitudinal groove 23 in the adjusting cap 24. A window 25 is provided in the adjusting cap 24 and in the axis of the longitudinal groove 23 through which the numerals of the adjusting scale on the guiding rod can be read off. The part 2$^a$ of the pointer is pivoted to the clockwork pointer 2, for instance by means of a springed plate 26 or by means of a suitable hinge and supports within itself the spring-loaded pointer pin 4, the shank 4$^a$ of which normally rests on the spring cap 11.

On the upper side of the clockwork casing a barrel safety device is provided, the object of which is to prevent any premature explosion of the projectile while still within the barrel. As shown for instance in Figs. 1 and 2, this device comprises an upright flange 19 against which the head 4ᵇ of the pointer pin 4 normally rests under the action of the pin spring 3 and is held in this position by a knife-like guiding blade 20 which projects inwardly at an inclination and which is guided in a corresponding slot 21 in the part 2ᵃ of the pointer. The knife-like guiding blade 20 may be made integral with the barrel safety device or may be fixed to it or may consist of a separate angle piece inserted in the angle between the flange 19 and the top surface of the casing 5 and fixed jointly with it.

As the point at which the pointer 2 is fixed to the main shaft 1 of the clockwork mechanism lies considerably higher than the place where the flange 19 and the knife-like guiding blade 20 are fixed and as the part 2ᵃ of the pointer is pivoted to the pointer 2, the part 2ᵃ of the pointer, as is clearly shown in Fig. 1, is given a permanent inclination to the axis of the main shaft 1 of the clockwork mechanism. The surface of the spring cap 11 which releases the firing pin in a known manner may be flat, hemispherical, or inclined at any angle, as shown in Fig. 1. The timing ring 6 has a gap 7 through which the head 4ᵇ of the spring-loaded pin 4 can pass under the action of the pin spring 3 at a suitable moment.

After the time ring 6 has been completely screwed on to the clockwork casing 5 the adjusting cap 24 is slipped with its groove 23 over the guiding rod 22 and the time ring 6 is inserted in the fuse cap 27 and held there by screwing on the fuse nut 28. By turning the adjusting cap 24 the time ring 6 is also turned owing to the guiding rod 22 being guided in the groove 23 so that the time ring 6 can be screwed upwards and downwards with its thread 17 in the thread of the clockwork casing. As the scale for the time ring is marked on the guiding rod 22 and therefore moves upwards and downwards together with the time ring 6 and as the window 25 is provided in the adjusting cap 24 the desired numeral of the adjusting scale to be set can be read off in the window 25. When it has been ascertained through the window 25 that the desired numeral has been set, the time fuse will have been adjusted to the required moment of operation and the setting key for setting the fuse will also show the desired setting.

In the time fuse with clockwork mechanism according to the present invention the safety device for locking the mechanism during transport consists of a spring-loaded pin which locks the balance against movement and which, when the projectile is fired releases the balance owing to its inertia, thus allowing the clockwork to start. At the moment of firing the balance is released and also a brake member 30 in a known manner owing to the action of inertia. The brake member is disposed in the axial direction of the clockwork casing and is provided with edges 29, the edges 29 being caused to press against the thread 17 of the time ring 6 and hold it in position, when the brake member is released. Owing to the release of the balance the pointer 2, 2ᵃ commences to turn and, by being guided on the knife-like guiding blade 20, moves as before in the plane of the upper side of the clockwork casing until the slot 21 leaves the knife-like guiding blade 20. The head 4ᵇ rests for the same period of time against the guiding flange 19 of the barrel safety device. Hence, the head 4ᵇ cannot immediately pass through the opening 7, should the time ring 6 have been incorrectly set, owing to the flange 19 being in front of the said opening, so that the projectile is prevented from bursting in the barrel or shortly after leaving the same. While still passing the last portion of the flange 19, the pointer pin 4 is thrown forward by its spring 3 and out of the part 2ᵃ of the pointer and enters the corresponding part of the thread 17 along which it travels once or several times according to the setting of the ring 6, until, on reaching the gap 7, it passes through the same, the shank 4ᵃ releasing the spring cap 11, so that the latter is thrown upwards under the action of its spring 12, thus releasing the arm 10 which secures the firing pin. As the part 2ᵃ of the pointer is pivotally attached to the pointer 2, the part 2ᵃ it is capable of screwing itself upwards with the pointer pin 4.

As the pointer pin 4 is adapted to be gradually screwed upward in the thread of the time ring 6 the time fuse according to the present invention provides a far longer setting path and consequently the possibility of far more accurate setting than time fuses of a known kind which only allow the pointer to travel round once.

What I claim is:

1. A time fuse for a projectile, comprising in combination a timing member in the shape of a ring having an internal helical groove, a pointer, a clockwork mechanism for operating the said pointer, a pin on the said pointer, capable of directly engaging in the said helical groove and of travelling in it along a predetermined distance according to the setting of the timing member, a spring for causing the pin to engage in the helical groove after the projectile has been fired and a gap at the end of the helical groove for receiving the pin, as and for the purpose set forth.

2. A time fuse for a projectile, comprising in combination a time ring having an internal helical groove, a clockwork mechanism having a main shaft, a casing for the said clockwork mechanism, a pointer fixed to the said shaft so as to rotate with it, an arm pivoted to the said pin so as to be capable of swinging in the axial direction of the projectile, a pin capable of sliding in the said pivoted arm and of engaging in the said helical groove and of travelling in the latter along a predetermined distance according to the setting of the time ring, a spring for causing the pin to engage in the helical groove after the projectile has been fired and a gap at the end of the helical groove for receiving the pin, as and for the purpose set forth.

3. A time fuse as claimed in claim 1, and comprising a casing for the clockwork mechanism, a thread on the said casing, a thread in the time ring capable of engaging with the thread on the casing for enabling the time ring to be adjusted with respect to the casing, a cap on the projectile, a groove in the said cap parallel to the axis of the projectile, a rod on the outside of the time ring capable of sliding in the said groove and a scale on the said rod as and for the purpose set forth.

4. A time fuse as claimed in claim 2 and comprising a short blade fixed to the casing of the clockwork mechanism and capable of engaging with the slotted end of the pivoted arm of the pointer to prevent the arm oscillating and a short flange fixed to the casing of the clockwork mechanism for preventing the pin from sliding radially till shortly after the projectile has been fired, as and for the purpose set forth.

In testimony whereof I have signed my name to this specification.

PAUL LEIBERGELD.